United States Patent Office 3,639,638
Patented Feb. 1, 1972

3,639,638
CORONARY VESSEL DILATION
John C. Krantz, Jr., Gibson Island, and Raymond M. Burgison, Catonsville, Md., assignors to The Chattanooga Medicine Company, Chattanooga, Tenn.
No Drawing. Continuation of application Ser. No. 791,159, Jan. 14, 1969, which is a continuation-in-part of application Ser. No. 428,556, Jan. 27, 1965, which in turn is a continuation-in-part of application Ser. No. 33,380, June 2, 1960. This application July 30, 1969, Ser. No. 848,408
Int. Cl. A16k 27/00
U.S. Cl. 424—349
8 Claims

ABSTRACT OF THE DISCLOSURE

This invention relates to the dilation of coronary vessels and more particularly coronary arteries, and more particularly to the achieving of coronary vessel dilation by sublingual or subcutaneous administration of a haloglyceryl dinitrate, most particularly chloroglyceryl dinitrate.

CROSS REFERENCE TO RELATED APPLICATIONS

This application is a continuation of our copending Ser. No. application 791,159, filed Jan. 14, 1969, which is a continuation-in-part of application Ser. No. 428,556, filed Jan. 27, 1965, which in turn is a continuation-in-part of application Ser. No. 33,380, filed June 2, 1960, all now abandoned.

BACKGROUND OF THE INVENTION

As is well known, nitroglycerin is administered in small dosages (sublingually or subcutaneously) to persons having heart diseases or disorders of certain types for the purpose of dilating the coronary arteries. Nitroglycerin is a vasodilator of short duration having a recognized toxicity limiting the amount and frequency of dosages. It is also well known that the tolerance for nitroglycerin in patients varies and in the case of many patients its use is contra indicated. Because there is a substantial demand for vasodilators of short duration, such as nitroglycerin, and because, in any given patient, one of these pharmaceuticals may well be found to be distinctly superior to any of the others including nitroglycerin, medical research has devoted a substantial amount of time and expense to the discovery of other suitable vasodilators.

SUMMARY OF THE INVENTION

The instant invention relates to the discovery of another compound that is useful for dilating coronary arteries and, in fact, a compound that is different and distinct from nitroglycerin in its response in certain patients and thus superior to nitroglycerin for use with certain patients.

It is, therefore, an important object of the instant invention to provide a new pharmaceutical for use in dilating the coronary arteries.

It is a further object of the instant invention to provide a new method of dilating the coronary arteries which comprises administering chloroglyceryl dinitrate to a human host.

Yet another object of the invention is to provide a new method of dilating the coronary arteries which comprises administering haloglyceryl dinitrate to a human host.

Still further the present invention provides as a new compound, a haloglyceryl dinitrate wherein the halo group is selected from the class consisting of F, Br and I.

The instant invention consists in a new use for a haloglyceryl dinitrate, namely, its use for dilating for coronary arteries. Chloroglyceryl dinitrate differs chemically in structure from nitroglycerin, as follows:

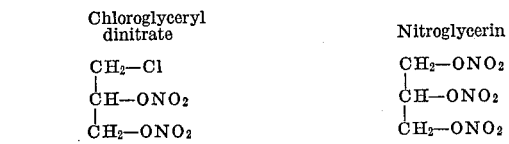

Chloroglyceryl dinitrate may also be referred to as 3-chloro-1,2-propanediol dinitrate or the dinitrate of 3-chloro-1,2-propanediol.

Chloroglyceryl dinitrate is disclosed in Beilstein's Organische Chemie, vol. I, p. 474, and its preparation is described by Henry, Ann., 155, 165. This, in essence, involves the nitration reaction of alpha-chloropropylene glycol (3-chloro-1,2-propanediol) with red fuming nitric acid at $-10°$ to $10°$ C. The crude product is poured into a large volume of ice, stirred until the blue color disappears, then washed several times with large volumes of ice and water until all of the free acid is removed. The oily layer resulting is separated and dried overnight over anhydrous calcium chloride; and the product thus prepared has a density of around 1.5. For safety reasons the oily product is diluted with lactose to form a 10% triturate.

Chloroglyceryl dinitrate is found to be an oily liquid which is relatively insoluble in water, but soluble in oils and in polyglycols such as Carbowax 300.

DESCRIPTION OF PREFERRED EMBODIMENTS

In order to test the coronary dilating action of chloroglyceryl dinitrate, it is compared with nitroglycerin on the perfused rabbits' heart (Langendorff preparation). Doses of 0.1 and 1 mg. of each compound were used; and the results were calculated on the percentage change of ml./beat of coronary flow. The experiments were repeated four times and it was found that chloroglyceryl dinitrate evoked a greater percentage increase than did nitroglycerin.

It was found that in the etherized dog chloroglyceryl dinitrate administered sublingually in alcoholic solution evoked a fall in blood pressure comparable to that produced by glyceryl trinitrate (i.e. nitroglycerin) and there was no significant change in the EKG pattern.

Using two dogs under ether anesthesia and a dosage of 0.5 mg./kg. in 2% solution containing 50% Carbowax 300 and 10% alcohol, comparative studies were made for intravenous administration with nitroglycerin; and it was found that each compound evoked a prompt depressor response at 25 to 35 mm. Of the two compounds chloroglyceryl dinitrate appears to evoke a lesser degree of hypotension; and there were no significant EKG changes. Similar administration of 5 mg./kg. of chloroglyceryl dinitrate produces a depressor response of 50 mm.

In a test using dosages of 5 mg./kg. of chloroglyceryl dinitrate intraperitoneally for five consecutive days on two monkeys, 2 dogs and 10 rats, it was found that the animals maintained normal body weight and showed no outward signs of toxicity, and there were no observable changes in the behavior patterns of the animals.

In the case of human beings, preliminary pharmacological studies indicate that chloroglyceryl dinitrate is a more potent coronary dilator than nitroglycerin. The recommended dosage sublingually is 0.005 grain (or about 0.3 mg.), but this compound can be administered in dosages ranging from 0.05 to about 1 mg. sublingually or subcutaneously. When administered to a human host in recommended dosages such as those just specified, chloroglyceryl dinitrate will effect a noticeable reduction in blood pressure and dilation of the coronary arteries for a relatively short period of time.

The instant invention not only relates to the use of any chloroglyceryl dinitrate, i.e. 3-chloro-1,2-propane-diol nitrate or 2-chloro-1,3-propanediol dinitrate (which is prepared by using the procedure just described using, as a starting material, 2-chloro-1,3-propanediol), but also to the use of any haloglyceryl dinitrate, wherein the halo group may be Br, F or I (all of which compounds are new). Such compounds may be used in substantially the same manner as just described (for chloroglyceryl dinitrate) to obtain substantially the same results.

In preparing the new haloglyceryl dinitrates, one may first carry out a substantially equimolar reaction between allyl alcohol in water and the halogen vapor, for example, as follows:

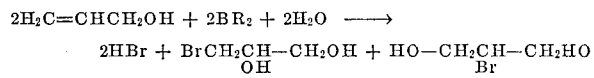

which reaction actually results in a mixture of two or more products (possibly including $$BrCH_2-CHBr-CH_2OH$$

that can be separated by close fractionation. The resulting halo-propanediol is then nitrated using the nitration procedure already described in connection with chloropropanediol. The resulting compounds include the following:

The dinitrate of 3-chloro-1,2-propanediol
The dinitrate of 3-bromo-1,2-propanediol
The dinitrate of 3-fluoro-1,2-propanediol
The dinitrate of 3-iodo-1,2-propanediol
The dinitrate of 2-bromo-1,3-propanediol
The dinitrate of 2-fluoro-1,3-propanediol
The dinitrate of 2-iodo-1,3-propanediol
The dinitrate of 2-chloro-1,3-propanediol It will be understood that modifications and variations may be effected without departing from the spirit and scope of the novel concepts of the present invention.

What is claimed is:

1. Method of treating a patient having a heart condition requiring dilation of the coronary arteries, which comprises administering to the patient a coronary dilating effective dose of a haloglyceryl dinitrate, the mode of administration being sublingual.

2. Method according to claim 1 wherein said haloglyceryl dinitrate is chloroglyceryl dinitrate.

3. Method according to claim 1 wherein the administration is sublingual and the dose is about 0.05 mg. to about 1 mg.

4. Method according to claim 3 and wherein said haloglyceryl dinitrate is chloroglyceryl dinitrate.

5. Method of treating a patient having a heart condition requiring dilation of the coronary arteries, which comprises administering to the patient a coronary dilating effective dose of a haloglyceryl dinitrate, the mode of administration being subcutaneous.

6. Method according to claim 5 wherein the mode of administration is subcutaneous and the dose is about 0.05 mg. to about 1 mg.

7. Method according to claim 6 and wherein said haloglyceryl dinitrate is chloroglyceryl dinitrate.

8. Method according to claim 5 wherein said haloglyceryl dinitrate is chloroglyceryl dinitrate.

References Cited

Klinskaya et al.: Trudy Nauch. Sessil Leningrad. Nauch-Issledovated. Inst. Cigeny Truda i Profzabolevanii za 1956 God, Leningrad, pp. 265–273.

RICHARD L. HUFF, Primary Examiner